United States Patent [19]

Fischer et al.

[11] 4,201,528

[45] May 6, 1980

[54] MECHANICAL MEANS FOR REDUCING CRACKING IN SOAP BARS

[75] Inventors: Charles F. Fischer, Park Ridge; Cesare N. Marchesani, Maywood, both of N.J.

[73] Assignee: Colgate-Palmolive Company, New York, N.Y.

[21] Appl. No.: 920,929

[22] Filed: Jun. 30, 1978

[51] Int. Cl.² .............................................. B29F 3/06
[52] U.S. Cl. ..................................... 425/209; 366/81; 425/380; 425/461
[58] Field of Search .................. 264/75; 425/461, 209, 425/466, 467, 381, 380; 252/367; 366/81

[56] References Cited

U.S. PATENT DOCUMENTS

| 2,414,097 | 1/1947 | Garvey et al. | 264/176 R |
| 2,640,033 | 5/1953 | Marshall | 252/367 |
| 3,371,378 | 3/1968 | Baier | 425/467 |
| 3,559,561 | 2/1971 | Page et al. | 425/461 |
| 3,779,676 | 12/1973 | Bernard | 425/131.1 |
| 3,923,438 | 12/1975 | Perla | 425/131.1 |

*Primary Examiner*—Jeffery R. Thurlow
*Attorney, Agent, or Firm*—Herbert S. Sylvester; Murray M. Grill; John A. Stemwedel

[57] ABSTRACT

Fittings for reducing cracking in soap bars including protrusions on the end flight on the worm or auger of a soap plodder to break up the glazed layer of soap formed by the wiping action of the end flight on the soap as it is discharged. The plodder is provided with a cone nozzle and fittings are provided for eliminating the spiral movement of the soap mass and forming a laminated bar by extrusion through aligned slots. The concept of the invention also includes the elimination of the central or the spongy mass of soap and the formation of a harder grain structure for the soap.

4 Claims, 9 Drawing Figures

MECHANICAL MEANS FOR REDUCING CRACKING IN SOAP BARS

BACKGROUND OF THE INVENTION

1. Field of the Invention

This invention relates to soap manufacture and more particularly to mechanical means for reducing cracking in soap bars.

2. Description of the Prior Art

In the past it has been found that extruded soap bars have different degrees of performance. Recent studies and development have provided adequate tests for cracking especially surface cracking. While many attempts have been made to resolve the problem in toilet soaps, the solution has been an evasive one. The recently developed soap wet crack tests show that extruded soaps conventionally produced have a cross sectional grain pattern similar to that of a tree trunk. The grain pattern can be changed, the soap bar made more homogeneous with harder grain characteristics by various fittings adapted to be added to existing extruders in accordance with the present invention to overcome the tendency of soap to crack and thereby to raise the performance of the soap.

SUMMARY OF THE INVENTION

It is therefore an object of the invention to provide mechanical means which may be added to existing soap plodders to produce toilet soap bars by the manufacture of a more homogeneous soap bar by elimination of glazed layers of soap, by the elimination of the inner spongy mass of soap and by providing a grain pattern for the soap which is arranged horizontally in layers in a laminated or parallel form and the elimination or reduction of radical spurs radiating across the short axis of the bar thereby reducing surface cracking and providing a soap bar having a better performance.

In carrying out the invention the worm or auger of the plodder may have its end flight provided with protrusions in the form of studs or the like which will break up the glazed action normally resulting from the wiping of the end flight across the soap mass as it is discharged.

Other concepts of the invention include the positioning of fittings within the cone nozzle of the soap plodder so as to cause layered lamination of the discharged soap mass and to eliminate the spiral movement thereof. The invention further conceives of utilizing a plug or torpedo within the cone nozzle for eliminating the spongy central mass of the discharged soap thereby providing for a harder grain structure.

Further objects of the invention in addition to reducing or eliminating surface cracking of toilet soap bars is to accomplish this results without radical change to existing soap plodders and without requiring any additional soap additives and without requiring any special compounding of chemicals while increasing the performance of the soap bar since surface cracking not only renders the soap bar unattractive but reduces the effective length of use of the soap bar. The concept of this invention achieves soap bar extrusions of stronger refined texture which can be extruded at elevated temperatures with a higher $H_2O$ level because of the elimination of the spongy soap in the core of the cone nozzle.

These, together with the various ancillary objects and features of the invention, which will become apparent as the following description proceeds, are attained by these mechanical means for reducing cracking in soap bars, preferred embodiments of which have been illustrated in the accompanying drawings:

DETAILED DESCRIPTION OF THE INVENTION

Figure 1:
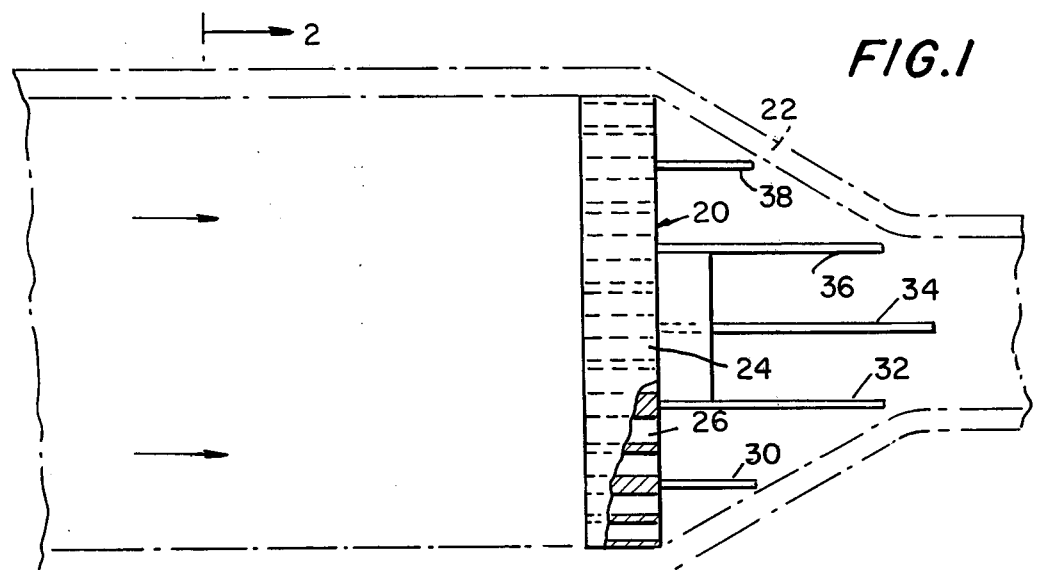
FIG. 1 is a side elevational view of a fitting in accordance with the concepts of the present invention as mounted in a cone nozzle.
Figure 2:
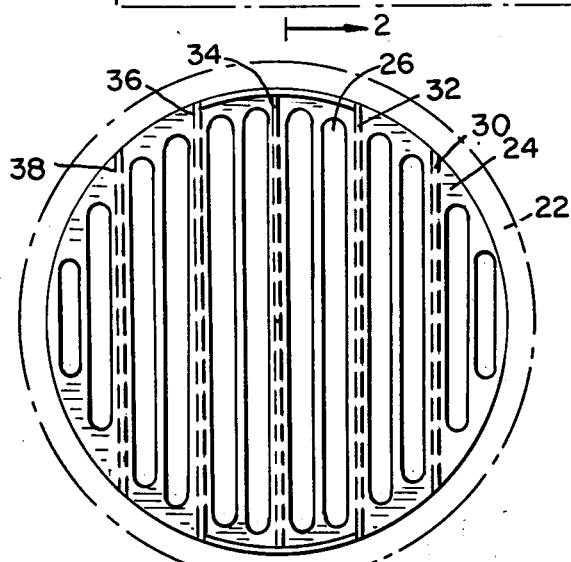
FIG. 2 is a vertical sectional view taken along the plane of line 2—2 in FIG. 1.

With continuing reference to the accompanying drawings and with initial attention directed to the embodiment of the invention as shown in FIGS. 1 and 2, it has been found that the elimination of the radical spiral of the soap mass as it passes from the end flight of the worm of a soap plodder into and through the length of the cone nozzle improves the performance quality of the finished toilet soap bar. To achieve the elimination of the radical spiral of the soap mass, a fitting generally indicated at 20 is mounted in the cone nozzle 22 of the soap plodder. The fitting includes a back plate 24 provided with a series of parallel slots 26 therein, the largest of the slots being adjacent the center of the plate 24, while the smaller slots are outward thereof. Between each of the slots or each pair of slots, as is shown best in FIG. 2, a plurality of vanes 30, 32, 34, 36, etc. are attached to the back plate 24 with the vane 34 extending forwardly in the nozzle of the back plate a greater distance than the outwardly disposed vanes 32 and 36, etc. for guiding the soap mass into the slots to form laminated parallel layers of the extruded soap mass and to reduce the radical spiral of the soap mass as it was extruded and eliminate such.

Figure 4:
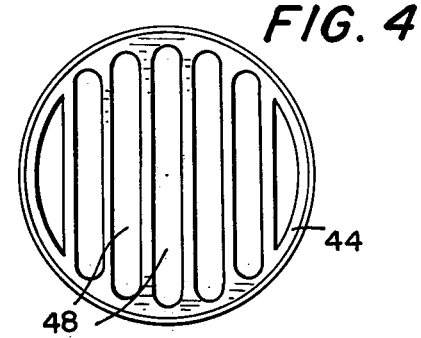
FIG. 4 is an elevational view of the base plate looking along the plane of line 4—4 in FIG. 3.
Figure 5:
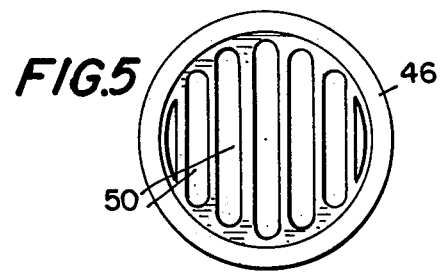
FIG. 5 is an elevational view of the outboard plate looking along the plane of line 5—5 in FIG. 3.
Figure 3:
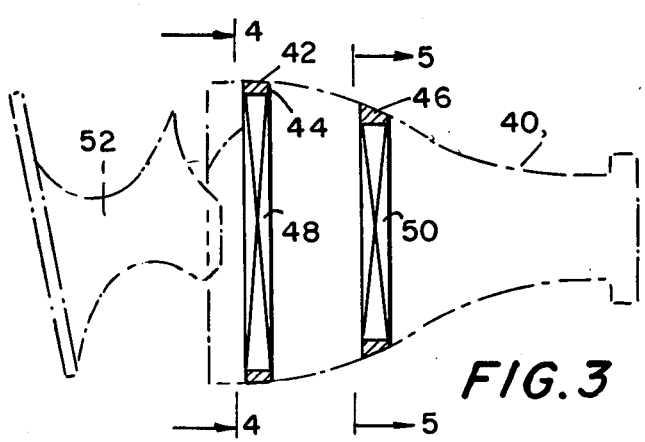
FIG. 3 is a schematic side elevational view of a modified form of fitting as arranged in a cone nozzle.
Figure 6:
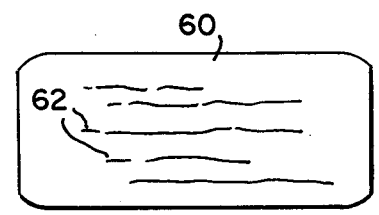
FIG. 6 is a plan view of a soap bar showing minimal surface cracking along horizontal layers.
Figure 7:
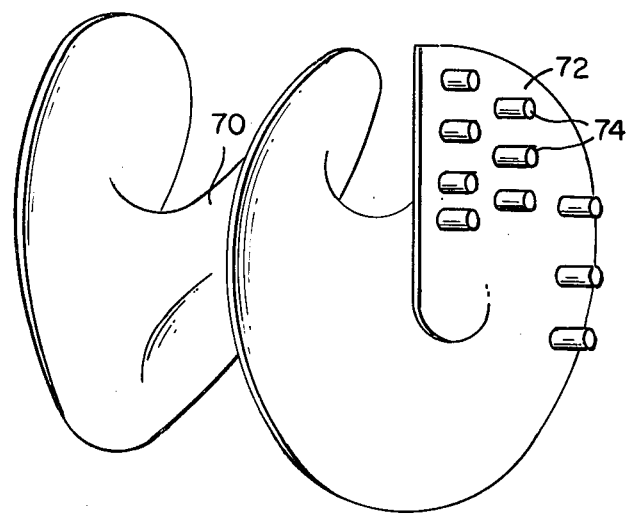
FIG. 7 is a perspective view of a portion of a worm of a soap plodder showing the end flight thereof with protrusions thereon.

In the embodiment as shown in FIGS. 3 through 6, there is disposed within the cone nozzle 40 a fitting 42 consisting of back plate 44 and outboard plate 46. The back plate construction is shown in FIG. 4 and includes a plurality of spaced parallel slots 48 therein while the outboard plate 46 which is of a lesser diameter than the back plate 44 has slots 50 therein which are of less width than the slots 48. As the soap mass is driven by the worm 52 into the cone nozzle 40, the radical spiral motion thereof is intermeted into a laminated parallel layer movement changing the cross sectional grain pattern of the soap and thereby reducing surface cracking. When the embodiment of the invention as shown in FIGS. 3 through 5 is employed, very little surface cracking in a soap bar 60 is had such as indicated at 62 and the radical spurs radiating across the short axis of the bar are eliminated thereby increasing the performance of the soap bar thereby produced to a much higher quality.

The concept of this invention further includes the breaking up of the glazed layer of soap which is fitted into the soap mass delivered by the auger or worm 70 of the soap plodder and caused by the wiping action of the end flight 72 of the soap plodder as it smears across the exiting soap mass. A plurality of protrusions preferably in the form of cylindrical plugs 74 extend forwardly of the end flight 72 in the direction of the movement of the extruding soap mass. This eliminates the smearing action and allows for a more homogeneous product thereby reducing cracking of soap bars.

Figure 8:
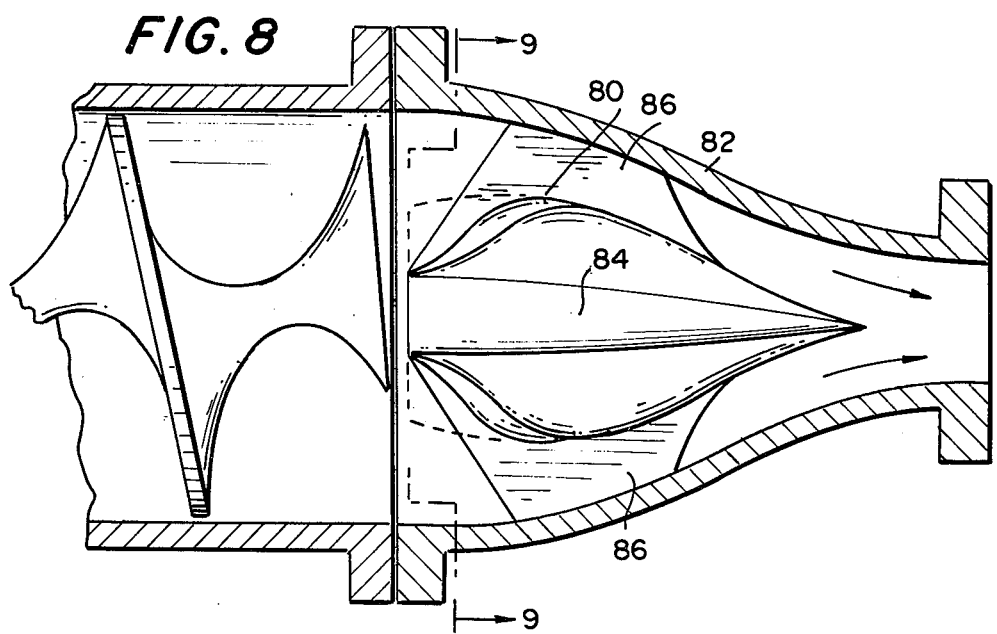
FIG. 8 is a longitudinal sectional view illustrating a cone nozzle with the plug therein; and, FIG. 9 is a vertical sectional view taken along the plane of line 9—9 in FIG. 8.
Figure 9:
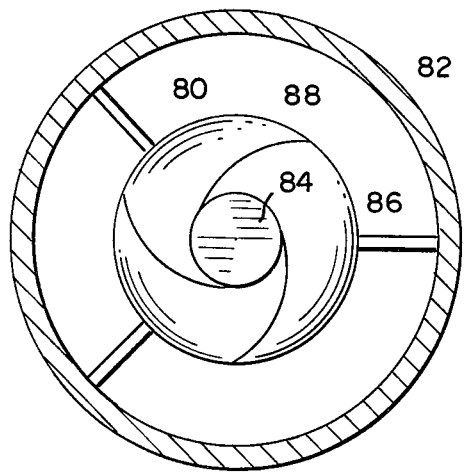

In the embodiment of the invention shown in FIGS. 8 and 9, a fitting 80 is associated with the cone nozzle 82. The fitting 80 includes a torpedo or plug 84 which may have the substantially ogive shape as shown in FIG. 8 as a preferred embodiment but may be of oval, rectangular, or circular cross section as may be desired and can have any suitable overall length. A plurality of spaced plates 86 arranged at a 120 degree angle to each other are used to center the torpedo or plug 84 in the cone nozzle 82 and attached to the cone nozzle are a plurality of vanes 88 also arranged in a helical pattern at a 120 degree spaced relationship to each other for causing the mass to be delivered in laminated layers.

The plug 84 fills the central void area off the end of the worm caused by the rotating worm shank. This void area generally fills with sponge soap and is now eliminated. The plug 84 in conjunction with the inner wall of the cone nozzle 82 forms a harmonious annulet for the fulllength of the plug 84. The annulet, thus formed, becomes the channel for positive non-rotating forward travel of the soap mass to the plodder nozzle forming plate producing an extrusion of a tight hard grain structure which can be extruded at elevated temperatures and increased water content. Through the use of this fitting a harder soap can be produced even at higher water levels and slightly higher extrusion temperatures. It is within the concept of making the plug 84 hollow for heating and chilling applications.

What is claimed is:

1. A fitting for reducing surface cracks in soap bars produced by extrusion from soap plodder having a cone nozzle, said fitting adapted to be mounted within said cone nozzle comprising a base plate which engages the interior of said cone nozzle, said base plate having a plurlity of spaced linear parallel slots therein extending transversely of said base plate, and a plurality of spaced parallel vanes secured to said base plate between said slots for inhibiting spiral movement of the soap mass after passing through said base plate, said vanes extending parallel to said slots.

2. A fitting according to claim 1, wherein said vanes are of differing length and extend longitudinally of said cone nozzle.

3. A fitting according to claim 1, wherein said vanes include central inner vanes and outer vanes on each side of said inner vanes, said inner vanes being longer than said outer vanes.

4. In a plodder for extruding soaps having a worm provided with an end flight, means for prevention of glazed soap generated by the smearing action of said end flight, said means comprising a plurality of spaced cylindrical studs fixed to said end flight of said worm and rotatable therewith for preventing the formation of a layer of glazed soap, said studs extending parallel to the axis of said worm.

* * * * *